United States Patent [19]

Corbett

[11] Patent Number: 5,085,813
[45] Date of Patent: Feb. 4, 1992

[54] DUST FREE PAN GRANULATOR AND METHOD OF OPERATION

[75] Inventor: Terry L. Corbett, Blue Springs, Mo.

[73] Assignee: Mobay Corporation, Pittsburgh, Pa.

[21] Appl. No.: 538,638

[22] Filed: Jun. 15, 1990

[51] Int. Cl.⁵ .............................................. B29C 67/02
[52] U.S. Cl. ...................................... 264/117; 425/8; 425/73
[58] Field of Search ..................... 425/73, 8, 80.1, 112; 264/117; 241/101.2, 119; 277/59

[56] References Cited

U.S. PATENT DOCUMENTS

| | | | |
|---|---|---|---|
| 4,031,175 | 6/1977 | Cooper | 264/117 X |
| 4,264,543 | 4/1981 | Valenta | 264/117 X |
| 4,350,481 | 9/1982 | Corea et al. | 425/73 |
| 4,441,720 | 4/1984 | Dibowski et al. | 241/119 X |
| 4,501,430 | 2/1985 | Kuhl et al. | 277/59 |
| 4,631,156 | 12/1986 | Hills et al. | 264/117 X |

FOREIGN PATENT DOCUMENTS 8805345 7/1988 World Int. Prop. O. .......... 264/117

OTHER PUBLICATIONS

Hawley, G. G., *The Condensed Chemical Dictionary*, 8th Edition, 1971, p. 701.

*Primary Examiner*—Richard L. Chiesa
*Attorney, Agent, or Firm*—Joseph C. Gil; Lyndanne M. Whalen

[57] ABSTRACT

A dust free zone is created in a granulator by including a dust barrier in the pan of the granulator in a position such that the pan is divided into two sections. The inlet for feeding material to be granulated is located in one section of the apparatus and the discharge outlet is located in the other section. This device makes it possible to conduct a granulation process on a continuous basis without interruption and without exposure of workers to potentially hazardous dust.

4 Claims, 1 Drawing Sheet

DUST FREE PAN GRANULATOR AND METHOD OF OPERATION

BACKGROUND OF THE INVENTION

The present invention relates to a pan granulator which has been adapted to substantially eliminate worker exposure to dust generated during the granulation process.

Dust generation during granulation processes has long been a problem for workers, particularly where the material being granulated is toxic. One solution to this problem has been the use of a ventilated hood that completely encloses the granulator. However, such devices make it impossible for a worker to easily gain access to the various portions of the granulator without interruption of the granulation process.

It would therefore be advantageous to have a granulation device adapted to create a "dust free" zone where workers would have access to granular heel without being exposed to hazardous dust or interruption of the granulation process.

SUMMARY OF THE INVENTION

It is an object of the present invention to provide a pan granulator which allows access to the granulated product without interruption of the granulation process and without exposure to dust.

It is also an object of the present invention to provide a pan granulator which enhances the removal of dust efficiently.

It is a further object of the present invention to provide a granulation process which may be carried out on a continuous basis without exposing workers to potentially harmful dust generated during the granulation process.

These and other objects which will be readily apparent to those skilled in the art are accomplished by including a solid barrier to divide the pan of the granulator into two sections and enclosing the section of the pan to which the material to be granulated is fed in a ventilated hood.

DETAILED DESCRIPTION OF THE PREFERRED EMBODIMENT

Figure 1:
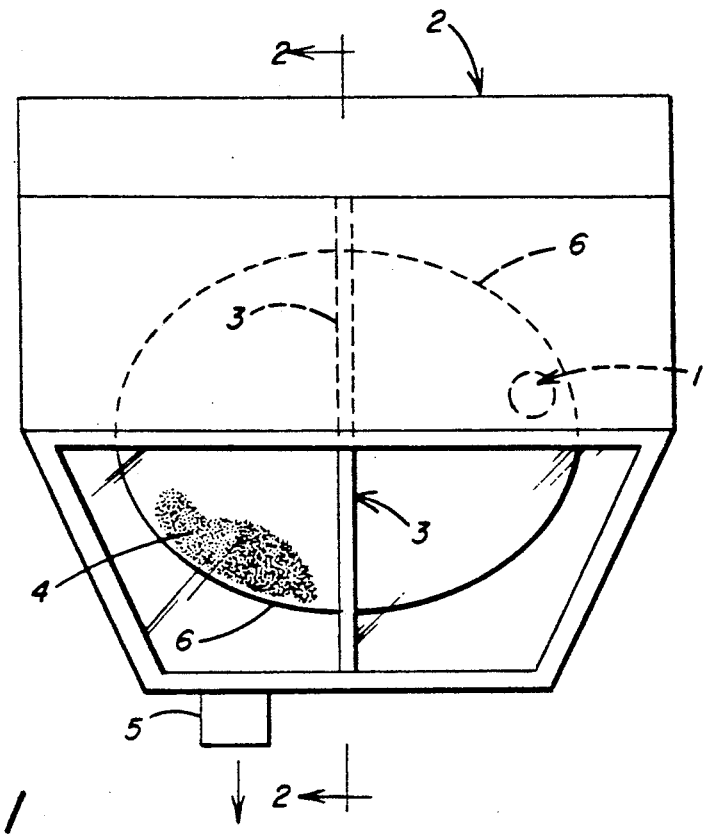
FIG. 1 is a top view of one embodiment of the pan granulator of the present invention.

Granulators suitable for use in producing particles of desired size are known. Examples of such devices are illustrated in U.S. Pat. Nos. 4,631,156; 4,501,430 and 4,441,720. It is these known devices which are modified to include the dust barrier of the present invention.

Granulators suitable for use in the present invention generally include a base and a rotatably supporting pan or container. The base houses a means for rotating the pan about an axis inclined from horizontal. The axis of rotation may be varied, generally between approximately 40 degrees to approximately 60 degrees from horizontal. The inclination of the pan is typically adjusted by a wheel and the speed of rotation of the pan is adjusted to partially regulate the particle size of the granules or particles exiting the pan. The pan includes a base portion which has a floor and a sidewall extending perpendicularly with respect to that floor. Granules are primarily formed in the base pan. The particle size produced by the pan granulator is a function of a variety of parameters including the angle of the pan, the type and amount of binder used, the rotational speed of the pan and the percent of granules recycled to the pan. In the device illustrated in FIG. 1, the diameter of pan 6 was 45 ft. (13.7 m). Pan 6 is generally inclined at an angle of approximately 40 to 50 degrees from horizontal and rotated at a speed of from about 16 rpm to about 30 rpm during the granulation operation.

The granulators useful in the present invention also generally include a fixed arm to which a plurality of plows which extend into the pan to help segregate particles forming within the pan. This helps classify the particles within the granulator.

The granulators of the present invention (illustrated in FIG. 1) differ from these known granulators in that a barrier 3 is positioned in the pan 6 in a manner such that it extends from top to bottom. The barrier position given in the invention is erected down the middle of the pan. Barrier 3 thus divides the pan into two sections with one section containing the powder feed inlet 1 and the other section containing the discharge outlet 5. Ventilation hood 2 is located over the section of pan 6 containing powder feed inlet 1 and optionally over the section of pan 6 containing discharge outlet 5. Ventilation is not required for the discharge section of pan 6 because no significant amount of dust is present in this area which is designated in FIG. 1 as area 4.

Barrier 3 may be made of any material capable of withstanding the environment present in the granulator. In the device illustrated, a PLEXIGLAS acrylic sheet was used. Any ventilation apparatus such as a ventilation hood could be used in the present invention. The granulator used in the illustrated apparatus is available from Feeco International and is sold under the name Pelletizing Disc - SD 390.3.

Any material which may be granulated in known devices may be processed in the granulation device of the present invention. Examples of specific materials which may be used include: herbicides, fungicides, flue dust, etc.

The material to be granulated is fed into the granulation device through feed inlet 1 and continually rotated wetted in pan 6 until it has reached the desired particle size. Rotation is generally carried out at a speed of 16-30 RPM. The granulated product is then discharged via outlet 5. At any time during this process, a worker is able to make any additions or to remove any test samples from area 4.

Figure 2:
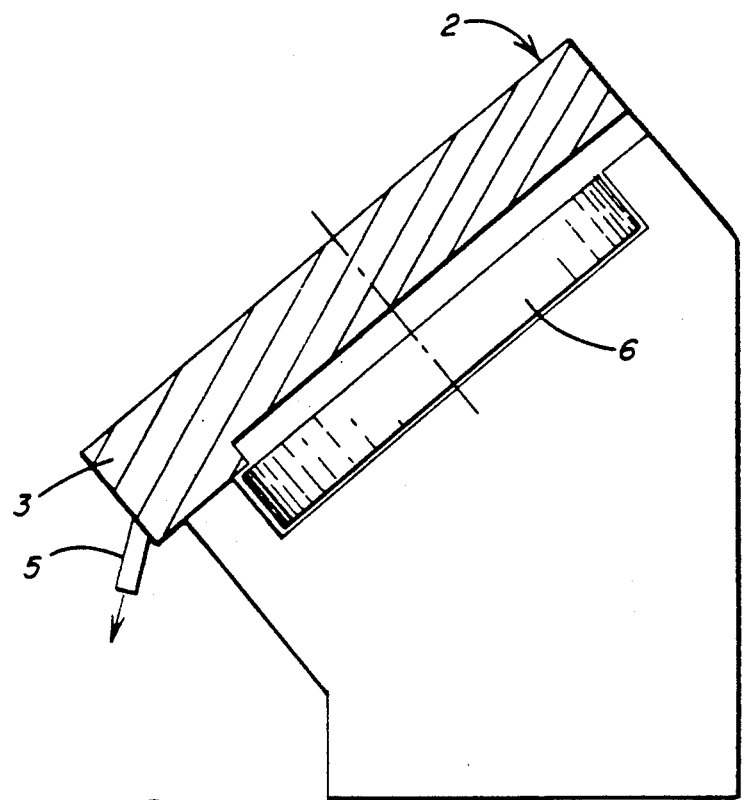
FIG. 2 is a cross sectional view of the pan granulator shown in FIG. 1.

FIG. 2 is a cross section of the granulator of FIG. 1 taken at A. The reference numerals in FIG. 2 correspond to those of FIG. 1.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A granulating device comprising a rotatable pan in which a dust barrier which is a sheet is positioned in the pan and extends from top to bottom down the middle of the pan in a manner such that the pan is divided into two sections, an inlet through which material to be granulated may be introduced into one of the sections of the pan, a discharge outlet from the other section of the pan and a ventilation device positioned over the section of the pan in which the inlet is located in a manner such that dust present in that section is prevented from entering the other section of the granulator.

2. The device of claim 1 in which the dust barrier is made of PLEXIGLAS acrylic sheet.

3. A granulation process in which
 (a) a solid material which is to be granulated is fed to a device comprising:
  (i) a rotatable pan in which a dust barrier which is a sheet is positioned in the pan and extends from top to bottom down the middle of the pan in a manner such that the pan is divided into two sections,
  (ii) an inlet through which the material to be granulated is introduced into one of the sections of the pan,
  (iii) a discharge outlet from the other section of the pan and
  (iv) a ventilation device positioned over the section of the pan in which the inlet is located in a manner such that dust present in that section is prevented from entering the other section of the granulator, and
 (b) the granulated material is collected therefrom.

4. The process of claim 3 which is carried out on a continuous basis or batch basis.

* * * * *